(12) United States Patent
Stennett et al.

(10) Patent No.: US 11,321,327 B2
(45) Date of Patent: May 3, 2022

(54) INTELLIGENCE SITUATIONAL AWARENESS

(71) Applicant: International Business Machines Corporation, Armonk, NY (US)

(72) Inventors: Steve Marshall Stennett, Palm Beach Gardens, FL (US); Jeffrey W. Talley, Scottsdale, AZ (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 16/391,483

(22) Filed: Apr. 23, 2019

(65) Prior Publication Data
US 2020/0004751 A1    Jan. 2, 2020

Related U.S. Application Data

(60) Provisional application No. 62/691,476, filed on Jun. 28, 2018.

(51) Int. Cl.
*G06F 7/00* (2006.01)
*G06F 16/00* (2019.01)
*G06F 16/2455* (2019.01)
*G06N 20/00* (2019.01)

(52) U.S. Cl.
CPC ...... *G06F 16/24568* (2019.01); *G06N 20/00* (2019.01)

(58) Field of Classification Search
None
See application file for complete search history.

(56) References Cited

U.S. PATENT DOCUMENTS

| | | |
|---|---|---|
| 4,812,820 A | 3/1989 | Chatwin |
| 4,855,713 A | 8/1989 | Brunius |
| 7,020,701 B1 | 3/2006 | Gelvin et al. |
| 8,925,392 B2 | 1/2015 | Esposito et al. |
| 9,129,290 B2 * | 9/2015 | Kannan .......... G06N 7/005 |
| 2003/0229475 A1 | 12/2003 | Osaka et al. |
| 2014/0156806 A1 * | 6/2014 | Karpistsenko ...... G06Q 50/28 709/219 |
| 2016/0247079 A1 * | 8/2016 | Mewes .......... G06N 5/048 |
| 2017/0006135 A1 * | 1/2017 | Siebel .......... H04L 69/40 |
| 2017/0060574 A1 * | 3/2017 | Malladi .......... G06F 9/542 |
| 2017/0083396 A1 * | 3/2017 | Bishop .......... G06F 11/1438 |
| 2017/0083579 A1 * | 3/2017 | Du .......... G06F 16/182 |
| 2018/0075115 A1 * | 3/2018 | Murray .......... G06F 16/2456 |
| 2018/0089312 A1 * | 3/2018 | Pal .......... G06F 16/2465 |
| 2018/0089324 A1 * | 3/2018 | Pal .......... G06F 9/5011 |

(Continued)

OTHER PUBLICATIONS

McDaniel, D., "An Information Fusion Framework for Data Integration", Proceedings of the 13th Software Technology Conference, May 3, 2001, 26 pages.

(Continued)

*Primary Examiner* — Tuan A Pham
(74) *Attorney, Agent, or Firm* — Scully, Scott, Murphy & Presser, P.C.; Brian Welle

(57) ABSTRACT

An intelligent situational awareness framework may be provided, which may facilitate ingesting the real-time data, persisting at least some of the real-time data on a storage device, analyzing the real-time data to derive at least one insight, and generating an output associated with the at least one insight for real-time visualization.

20 Claims, 9 Drawing Sheets

(56) References Cited

U.S. PATENT DOCUMENTS

2018/0196867 A1* 7/2018 Wiesmaier ............ G06F 16/285
2018/0232425 A1* 8/2018 Das ..................... G06F 16/2471

OTHER PUBLICATIONS

Gavrila, D.M., "The analysis of human motion and its application for visual surveillance", Proceedings of the 2nd IEEE International Workshop on Visual Surveillance (VS'99), Jun. 26, 1999, pp. 3-5.
Winterhalter, C.A., et al., "Wearable electro-textiles for battlefield awareness", Army Natick Soldier Center MA, Dec. 2004, 3 pages.
NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

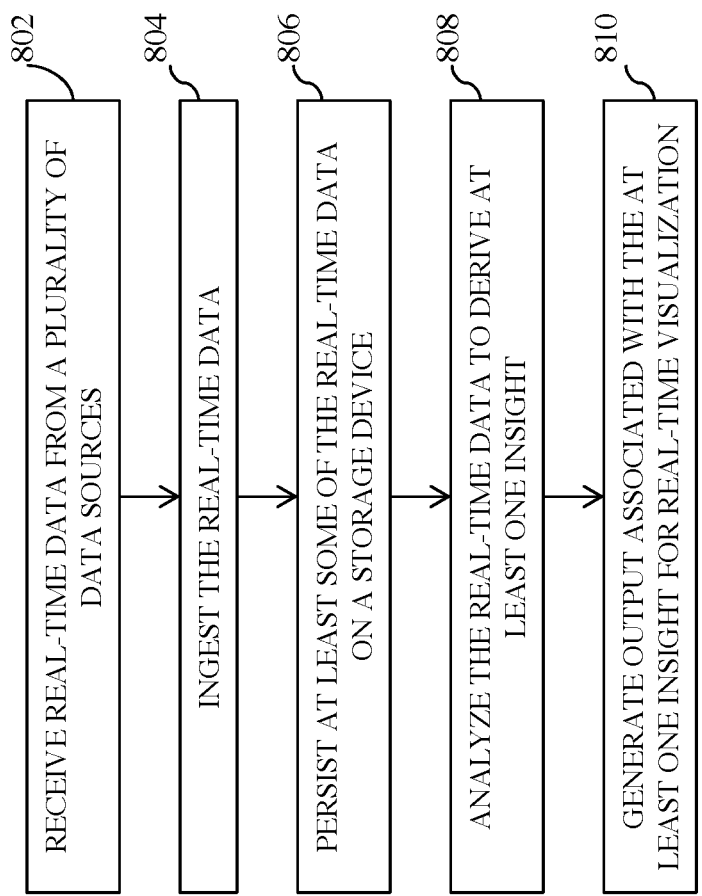

INTELLIGENCE SITUATIONAL AWARENESS

BACKGROUND

The present disclosure relates generally to computers and computer applications, and more particularly to providing a framework for real-time situational awareness and visualization thereof.

In many enterprises, data is spread across different systems and the connection points between those system can become complex. Such disparate systems in an organization can also have multiple databases, case management systems and data stores. Sharing data across such systems as well as being able to perform analysis on such data is also complex.

BRIEF SUMMARY

A system and method for intelligence situational awareness may be provided. The system, in one aspect, may include at least one hardware processor. A storage device may be coupled with the at least one hardware process. At least one hardware processor may be operable to receive real-time data from a plurality of data sources. At least one hardware processor may be further operable to ingest the real-time data. At least one hardware processor may be further operable to persist at least some of the real-time data on the storage device. At least one hardware processor may be further operable to analyze the real-time data to derive at least one insight. At least one hardware processor may be further operable to generate an output associated with the at least one insight for real-time visualization.

A method, in one aspect, may include receiving real-time data from a plurality of data sources. The method may also include ingesting the real-time data. The method may further include persisting at least some of the real-time data on a storage device. The method may also include analyzing the real-time data to derive at least one insight. The method may further include generating an output associated with the at least one insight for real-time visualization.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 8 is a flow diagram illustrating a method in one embodiment.

DETAILED DESCRIPTION

Figure 1:
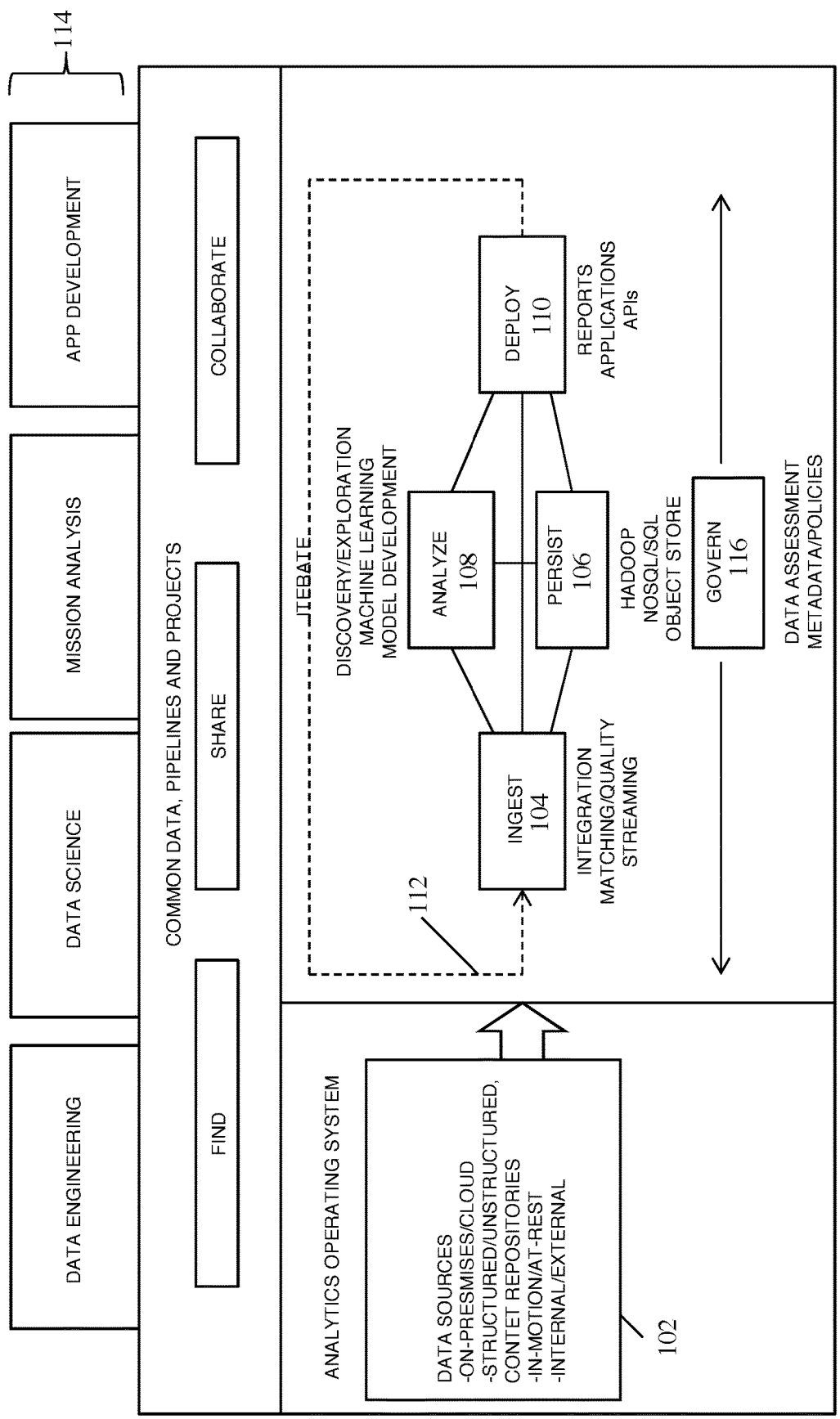
FIG. 1 illustrates architecture of a framework of a platform in one embodiment.

Systems, methods and techniques in embodiments allow for secured-communication and operational system, for example, where multiple parties and/or multiplications are involved. In embodiments, a system may permit leveraging multiple sources for better mission outcomes, for example, with field commanders, personnel, intelligent community. A data integration platform may manage a landing zone for governance. Analytic applications may be moved next to sensors, for example, radar, electronic counter measure (ECM) equipment, and/or others, and an analytic may be developed and/or used within a computing environment. This allows, for example, a data scientist or analyst or another to select the data source and select the analytic on a screen to test results. This process may continue until a desired result has been reached and a system remembers a configuration (e.g., a final configuration) for the future. For example, the system can maintain its configuration state. A business process management tool may be created that is cognitive and can learn from the data, and for example, from a user, on the loop.

In some embodiments, a system may provide anticipatory intelligence, for example, to sense and warn on an emerging condition, and to inform an end user on an issue, which may need a prompt attention. The system may provide data management and data fusion capabilities. For instance, the system may identify data and data repositories, which may be distributed across different system. The system may allow sharing data which may be distributed across the disparate systems, for example, across organizations and multiple databases, case management systems, and data store. A facility may be provided to allow for querying and understanding data, which may be available outside a group's control. If a needed data set or repository is not under the control of an implementing group, a copy of the data need not be created. The group is allowed to have access to the data repository and to create an index within the group's environment. Such a methodology can prevent a network saturation and allows for copying or accessing small parts of the data when needed. In some instances, access to the data may be the index of the data moved into the group's repository.

Situational awareness may include obtaining data about the past and present to sense the cumulative effects of various developments to generate potential futures. The system may employ data analytics to collect, organize and analyze sets of data to discover patterns and/or other information in order to understand the information contained in the data and identify data that can provide awareness. The system may "make sense" of aspects of all information collected, in the context of specific problems, thereby providing awareness of otherwise un-noticed yet valuable and potentially threat averting information. Data can be collected and the full context of this data can be analyzed to anticipate an unfolding event or events.

Situational awareness analytics may include descriptive analytics and diagnostic analytics. Descriptive analytics summarize what has happened and what is happening in the current time by condensing data into smaller, more useful pieces of information. Descriptive analytics examines indicators and metrics (e.g., select indicators and metrics also referred to as key indicators and metrics) to evaluate the past and present. Data modeling such as machine learning and data mining allow analysts to discover relationships in the data, and these analytics can identify entities and activities in the data for further automated processing. Descriptive analytics utilize structured and unstructured data to show trends and patterns through visualizations.

Diagnostic analytics provide a deeper level of analysis that indicates the root cause of the events and trends. Diagnostic analytics look at past behavior and understand that behavior by mining historical data to find the reasons for the outcome. These analytics uncover patterns and correlations that explain why trends are up or down. This insight can be used to drive predictive models.

Cognitive analytics may include predictive analytics, prescriptive analytics and anticipatory analytics. Predictive Analytics identify probable future outcomes of an event or the likelihood of a situation occurring by analyzing recent and historical data. Predictive analytics use indicators and models based on machine learning or expert defined rules to recognize events in advance of their occurrence. Insight gained from descriptive and diagnostic analytics form the basis of these predictive models. Predictive analytics can be used to identify areas of risk as well as areas of opportunity.

Prescriptive Analytics go beyond predicting future outcomes by suggesting decision options on how to take advantage of a future opportunity or mitigate a future risk and illustrate the implication of each decision option. These analytics evaluate multiple options, allowing for the consideration and comparison of the consequences of each. This provides a unique opportunity to identify risk and determine a course of action.

Anticipatory analytics begins with a foundation of situational awareness or contextual intelligence, maintaining a persistent representation of entities, activities, and their interrelationships within the knowledge space. Contextual intelligence provides greater insight into complex patterns of behavior, enabling the consideration of a broader range of plausible outcomes represented as competing hypothesis of potential future events. By incorporating second and/or third order relationships, behaviors, and activities of entities of interest, contextual awareness supports persistent surveillance of entities within the information space.

In some embodiments of a use case, a situational picture of data sources can be displayed on a visualization screen. The visualization screen or interface may be provided to a user device's display screen. In some embodiments, the visualization views can be provided within a system provided through a cloud, e.g., a hybrid cloud configuration and accessed by the end user as an analytics platform as a service. The end user can provide the data, the system can fuse the data, create a data to decision (data finding data) environment, identify dynamic entities, share the information with other users, and return an alert to the end user of any abnormal object behavior. This end user use case illustrates a part of the situational awareness stage along the analytics path with some cognitive analytics used for the interrogation of the abnormal object.

Multiple analytic functions can be made available within a library or repository. Any subset of or all of the analytic functions can be used from the repository to accomplish a mission for a use case. For example, there can be different levels of analytics functions such as data integration framework layer, knowledge framework and visualization framework. Data integration framework layer may include functions for information integration, governance and security, and streams computing. Knowledge framework may include functions for descriptive analytics, content analytics, sensor analytics, and natural language processing. Visualization framework may include functions for operations dashboards, mission visualization applications and workflow management.

An anticipatory solution may produce one or more of event forecasts, forecast trends, created weighted alternative hypotheses, and may generate alerts of real-time or near real-time events for the "human on the loop" or human machine assisted learning. This solution may consume multiple data sources and support multidisciplinary analytics to detect disruptive events before they occur to minimize surprises.

Such anticipatory solution may: Anticipate unexpected events in order to understand the complexities and potential interactions that could unfold in the future, not just make sense of the past or present; Assess a range of plausible outcomes and their respective impacts to compute trajectory and convergence (e.g., forecast, trend, model, hypothesize, simulate) to track where things are heading in information space, rather than provide a single point projection of the future; Orchestrate multi-platform, multi-theory, multi-disciplinary analytics to correlate and fuse all-source information, ingest and store data to build persistent contextual intelligence (e.g., problem centric, tactical, strategic) for analytic discovery while supporting anticipatory intelligence in cloud environments, e.g., Anticipatory Analytics as a Service.

An embodiment of an implementation of a system in the present disclosure may utilize data platform such as IBM®'s Watson Data Platform, from International Business Machines Corporation, Armonk, N.Y. IBM®'s Watson™ Data Platform is private-cloud based data and analytics platform built on a comprehensive set of data and analytics services. These services may include multiple processing engines capable of ingesting information, supporting real-time analytics, providing traditional data warehouse and data mart support, and running new analytical applications. Such a data platform can allow for individual user experience, data science experience, and may facilitate rapid collaboration between the data science team, application developer, and analysts. Via such a data platform, teams may be enabled to conduct complex analytics at high speeds. Such a platform may also make it faster for analyst teams to find, understand, provision and shape data, so they can spend their time testing their hypotheses. Advanced capabilities such as cognitive analytics tools are embedded in Watson™ Data Platform, helping organizations make smarter decisions through natural language processing, machine learning and other techniques. These technologies learn and interact to provide expert assistance in a fraction of the time required for gaining insights and putting them to work with traditional systems. While the present disclosure describes an implementation in terms of Watson™ Data Platform, implementation of the present methodology is not limited to that platform only. Rather, the methodology can be implemented on another platform.

The data science experience (also referred to as DSX), for example, by leveraging a data platform, can help data scientists collaborate with peers on projects to find better solutions together. DSX can be a platform that unifies numerous available components to help data scientists and analyst teams become better at what they do. Some of the challenges in using data science tools include installing, setting up, and maintaining them. DSX can provide a preconfigured data science platform out of the box, and manually performing these tasks may not be needed. Users can share their knowledge and code, help accelerate the advancement of data science for others, or get input from peers on their own work. Data scientists and analysts for their analysis can use tools, which can be integrated into the system, such as a web application in which a user can create and share documents, which documents can contain code, equations, visualization and text; programming environment or studio, via which a user can perform code development; and software platform that can provide capabilities for statistical analysis, machine learning algorithm, text analysis, and other analysis. The system in some embodiment allows a user to leverage those tools within a project. Once a model is complete, an application developer can then leverage that model within an application that they create within the programming environment or studio.

In some embodiments, a system and/or method can have capabilities such as: Governed self-service analytics with collaboration, which can meet the security and metadata requirements needed for a self-service environment with trusted access; Connect to data anywhere, where data need not be moved, but can connect to the data and perform advanced analysis, predictive analysis and/or machine learning against the data; Data ingest and analysis, for example, using a data integration service, in which data can be analyzed in real-time from a stream; Machine learning, automation and artificial intelligence, which is built "ready to apply" to augment decision-making; Accommodate structured, semi-structured and unstructured data, and enable automated data modeling that can be iterated (e.g., rapidly) to extract insight from data regardless of form. In some embodiment, a system can be built from out of the box components, for example, which can be easily integrated into existing environment.

FIG. 1 illustrates architecture of a framework of a platform in one embodiment. Customer's or user's on premise data sources 102 such as a data store (database) and/or object store may be in any format, for example, structured into rows and columns and/or unstructured data like video or documents. Data can go through an ingest process 104 where the data can be transformed, cleansed, and prepared using a data integration technology of the present disclosure, and/or the data can be analyzed in real-time from a stream. The framework can include a persist or storage area 106. The persist or storage area can be an existing data warehouse, stored in relational databases or another database, or another data store such as distributed storage. An analyze layer 108 can be connected the persist or storage area. In the analyze layer, models (e.g., artificial intelligence models) can be executed or data can be processed to derive insights. These analytics services can be made available for the users via the data science experience and applications via application programming interfaces (APIs). An action may be recommended based on a derived insight. A deploy area 110 may be provided where applications and analytics get moved into a production application. An arrow 112 from deploy 110 back to ingest 104 shows an iterative process. Such a data platform can enable fast deployment and iteration, in which analytics and experimentation can be performed. As data grows and changes, analytics and/or retraining of models in an agile method (e.g., dynamic and responsive manner) can take place. The framework also can include an interface to a user functionality, for example, an interface to a different functionality 114. Examples of user functionality may include, but are not limited to, data engineering, data science, mission analysis, and application development. Each of the functionality, for instance, can find the data, share assets, and collaborate on its analytics. Data governance component 116 may allow a user to be able to discover, classify, catalog, understand, cleanse, protect and retire data.

In one embodiment, data ingestion may include extracting, filtering or fusing data from a plurality of data sources based on geography and time. For instance, data may be fused based on proximity (e.g., threshold distance) in time and space (geography). In one embodiment, an intelligent situational awareness can remember a sequence of applications executed, whether in serial or parallel, to solve a given problem, and is able to recommend which application is working for the given problem.

FIG. 8 shows a flow diagram illustrating a method in one embodiment. At 802, real-time data may be received from a plurality of data sources (e.g., as shown in FIG. 1 at 102). At 804, the real-time data may be ingested (e.g., as shown in FIG. 1 at 104). At 806, at least some of the real-time data may be persisted on a storage device (e.g., as shown in FIG. 1 at 106). At 808, the real-time data may be analyzed to derive at least one insight (e.g., as shown in FIG. 1 at 108). At 810, output associated with the at least one insight may be generated for real-time visualization.

Infrastructure

In some embodiments, system may include collections of "dockerized" containers of data and analytics services. A tool or management system can be provided for automating deployment, scaling, and management of containerized microservices applications. Such an infrastructure can allow a system to have loose coupling between modules and horizontally scale out data, analytics, and model services, for instance, on a need basis.

The data services within a system's data platform can have an integrated data layer to enable connecting and storing metadata to existing data stores and/or object storage, which may be external to the data platform. For those data services and storage, data management and governance capabilities for ingestion (e.g., extract, transform, load), audit, lineage, entity resolution, master data management, and global name management can be made available as applicable.

Control and Operations Workflow

Mission tasks can be organized around programs or project. In some embodiments, the system allows a user to create a new project, for example, within a data science experience. Once a user creates a new project, the user can be presented with an interface for a project management framework where the user can view, create, add, modify, and/or remove various assets. Such a framework can promote collaboration across various user functionalities while still providing governance and oversight.

Incident Management Center

Projects created via a system of the present disclosure can allow different users and/or functionalities to share sets of assets while building their data products. For example, a user can create a project, add their assets such as documents and files in object storage, and add collaborators such as team mates. These collaborators can have different permission (viewer, editor, or admin) to different assets. The system can also provide integration of an application development environment, for example, with data science experience to enhance the collaboration between data scientists and application developer. The system can allow a team to combine code, data and visualizations in real-time. This feature enables users to connect a application development environment components and project components, publish to the application development environment and import from the application development environment, for example, for improved version control across analytic assets.

Data Ingestion

In some embodiments, the system's data platform provides data integration, for example, for the private cloud for real-time ingestion of data and for near-real time and batch ingestion of data. A tool that is designed to support data-in-motion use cases can be leveraged for real-time ingestion of data. Such a tool provides intelligent ingest, where data can be analyzed and only selected data (e.g., determined to be of value) can be persisted. Such a tool can also provide a summary of the data; filtering of the data; enrichment of the data before it is persisted. For near-real time and batch ingestion of data, a tool that allows for connecting to different at rest data store and/or object stores can be leverage, which for example, can analyze the data, perform cleanup of the data and persist the data within another target data store within the system's data platform.

Data Integration

Data integration services can provide data governance for the platform. In some embodiments, data integration services can incorporate data governance capabilities, which allow a user to discover, classify, catalog, understand, cleanse, protect and/or retire data as data moves through the platform. Data integration services can provide any one or more of the following: Transform and aggregate any data volume; Contain built-in transformation functions; Leverage shared metadata and enable collaboration; Support interaction with Representational State Transfer (REST) application programming interfaces (APIs); Use simple web-based dashboard to manage the runtime environment; Be able to integrate, cleanse, move and access data quickly; Understand all data, e.g., its origin, its usage; Discover data, for example, when needed, in context; 360° view of selected items appropriate for an organization; Ensure compliance, security, and privacy; Effectively respond to e-Discovery, and archiving needs; Support entity resolution for people, organizations, locations, and events; Support multicultural name matching; Direct data flow integration with streaming so that standard data integration conventions can be used to gather and pass information to real-time analytical processes.

Analytical Resources

In some embodiments, the system's data platform can provide components or resources for data science and analytics together in one place, making it easier for data science teams to learn, create, and collaborate. The system's data platform can allow a user to obtain community wide updates or information, such new software packages, libraries, techniques and tutorials that are or become available continuously. An interface inside a data platform can allow for access to such multiple functionalities, for example, so that a user need not have to open a number of different browser tabs to perform a research. In addition to resources that are made available for data discovery, programming, and others, tools such as a visual graphical user interface (GUI) can be provided to help users better perform a task. Tools for integration of machine learning and canvas features can be also provided.

Community Cards

Community cards refer to In-context learning and community components of the data science experience in the system. There may be four types of cards—data sets, documents (which may include code, executable programs, etc), tutorials, and articles. The community cards allow a user to learn about data science and experiment with its various tools and techniques on-the-fly as the user works in the system.

Documents:

Document management, for instance, creating, and editing of computer code (e.g. python) and rich text elements (paragraph, equations, figures, links) can be supported in the system. A document can be associated with a service instance for scalable execution of a service code. Different programming languages (compilers) and APIs can be supported. From a document in the data science experience component, analytics component can be used to blend multiple data types, sources, and workloads. Using a database query language such as a structured query language (SQL), a developer can apply their knowledge of SQL statements directly in the service code, and tap into a large number of relational databases supported by the service in order to apply in-memory analytics relational SQL databases. New problems can be addressed with the service's machine learning library, streaming and graph capabilities. Analytics applications can be developed using a unified framework across all of these libraries.

Decision Optimization

Prescriptive analytics functionality may include a decision optimization, for example, used to create and deploy optimization-based planning and scheduling applications, as well as other decision-making applications, which can optimize key performance indicators (KPIs) across multiple goals, decisions, and business constraints. The decision optimization can include existing optimizers. Providing such a decision optimization, which includes one or more optimizers, can allow teams of data scientists, developers, business analysts, and end-users to collaborate on their analytics projects. A REST API enables integration with any application. This service can also include modeling for non-programmers, scenario management, quick prototyping, and end-to-end application creation.

In some embodiments, the system also integrates a program development environment for developing data science applications, for example, including a statistical programming language for statistical analysis and machine learning. The system for instance can integrate a data processing tool or engine with such a statistical programming language, such that users can leverage a distributed computational engine to run large-scale data analysis from the statistical programming language. A program development environment for developing data science applications can include a console, syntax-highlighting editor that supports direct code execution, as well as tools for plotting, history, debugging and workspace management. This capability may be provided via a web application server.

Deep Learning

Data science experience can also support machine learning such as deep learning by providing programming libraries such as software libraries for performing numerical computation, machine learning programming, neural networks API, and machine learning training.

In some embodiments, the data science experience component (DSX) provides a single user interface (UI) for creating models, collaborating, deploying, monitoring, and integrating feedback. Machine learning in DSX can be accessed via one or more of APIs, wizard GUI, and/or another interface. With a single click, data scientists can deploy their machine learning models as web services.

Predictive Analytics Algorithm

In some embodiments, the system also integrates a software platform for performing statistical analysis, providing a library of machine-learning algorithms, text analysis, open-source extensibility, integration with big data and deployment into applications. For instance, predictive analytics algorithms can be used within the system, including for example, data preparation, classification and regression, clustering, forecasting, and survival analysis.

Data preparation may include the following functionalities/components:

Descriptive provides computation of the univariate and bivariate statistics and automatic data preparation features on large scale data. It can be used widely in data profiling, data exploration, and data preparation for subsequent modeling analyses.

The smart data preprocessing (SDP) engine is an analytic component for data preparation. This component can include separate modules: relevance analysis, relevance and redundancy analysis, and smart metadata (SMD) integration.

Sparse data convertor (SDC) converts regular data fields into list fields. Users can specify the fields to be converted into list fields, then SDC merges the fields according to their measurement level. This component can generate the following kinds of list fields: continuous list field, categorical list field, and map field.

The binning function can be used to derive one or more new binned fields and/or to obtain the bin definitions used to determine the bin values.

The hex binning function can be used to calculate and assign hexagonal bins to two fields.

The complex sampling function selects a pseudo-random sample of records from a data source.

The mrsampling function selects a pseudo-random sample of records from a data source at a specified sampling ratio. The size of the sample can be approximately the specified proportion of the total number of records subject to an optional maximum. The set of records and their total number can vary with random seed. Every record in the data source can have the same probability of being selected.

The sampling model function selects a pseudo-random percentage of the subsequence of input records defined by every Nth record for a given step size N. The total sample size may be optionally limited by a maximum.

Classification and regression may include the following functionalities/components:

The generalized linear model (GLE) is an analytical algorithm that can be used for different types of data. It can covers widely used statistical models, such as linear regression for normally distributed targets, logistic models for binary or multinomial targets, and log linear models for count data, and can also cover many useful statistical models via its very general model formulation. In addition to building the model, generalized linear model provides other useful features such as variable selection, automatic selection of distribution and link function, and model evaluation statistics. This model has options for regularization, such as LASSO, ridge regression, elastic net, etc., and is also capable of handling very wide data.

The linear support vector machine (LSVM) provides a supervised learning method that generates input-output mapping functions from a set of labeled training data. The mapping function can be either a classification function or a regression function. LSVM is designed to resolve large-scale problems in terms of the number of records and the number of variables (parameters). Its feature space is the same as the input space of the problem, and it can handle sparse data where the average number of non-zero elements in one record is small.

Random Trees is an approach for generating strong (accurate) predictive models. This approach, for example, can be used for classification or regression problems.

CHAID, or chi-squared automatic interaction detection, is a classification method for building decision trees by using chi-square statistics to identify optimal splits. An extension applicable to regression problems is also available.

Clustering may include the following functionalities/components:

Scalable two step cluster is based on two-step clustering algorithm, and can extend both its functionality and performance in several directions.

Cluster model evaluation (CME) may interpret cluster models and discover useful insights based on various evaluation measures.

Forecasting may include the following functionalities/components:

Data preparation for time series data (TSDP) provides a functionality that converts raw time data (e.g., in flattened multi-dimensional format, which includes transactional (event) based and column-based data) into regular time series data (e.g., in compact row-based format) which is required by the subsequent time series analysis methods. A job of TSDP is to generate time series in terms of the combination of each unique value in the dimension fields with metric fields. In addition, it sorts the data based on the timestamp, extracts metadata of time variables, transforms time series with another time granularity (interval) by applying an aggregation or distribution function, checks the data quality, and handles missing values if needed.

Time series data preparation convertor is a date/time convertor API that is used to provide some functionalities of the date/time convertor inside TSDP for applications to use.

Temporal causal modeling (TCM) refers to a suite of methods that attempt to discover key temporal relationships in time series data by using a combination of Granger causality and regression algorithms for variable selection.

Autoregressive (AR) models are built to compute out-of-sample forecasts for predictor series that are not target series. These predictor forecasts are then used to compute out-of-sample forecasts for the target series.

Time series exploration explores the characteristics of time series data based on some statistics and tests to generate preliminary insights about the time series before modeling. This component can covers analytic methods for expert users (including time series clustering, unit root test, and correlations), and also can provide an automatic exploration process based on a simple time series decomposition method for business users.

Expert modeler for time series forecasting is an automatic model identification tool. It applies some time series model, such as Autoregressive Integrated Moving Average (ARIMA) and/or exponential smoothing, to a specified target series and then recommends a model or top N models based on a model quality measure.

Additional time-series model may include: ModelReEstimate, GARCH (Generalized Auto Regressive Conditional Heteroscedasticity), exponential smoothing model, Croston and Modified Croston, Autoregressive Integrated Moving Average (ARIMA), and Reverse Data preparation for time series data (RTSDP)

Survival analysis may include following functionalities/ components:

Survival analysis analyzes data where the outcome variable is the time until the occurrence of an event of interest. The distribution of the event times can be described by a survival function.

Non-parametric distribution fitting (NPDF) can provide an estimate of the survival function without making any assumptions concerning the distribution of the data. NPDF includes Kaplan-Meier estimation, life tables, and specialized extension algorithms to support left censored, interval censored, and recurrent event data.

Parametric distribution fitting (PDF) provides an estimate of the survival function by comparing the functions for several known distributions (exponential, Weibull, log-normal, and log-logistic) to determine which, if any, describes the data best. In addition, the distributions for two or more groups of cases can be compared.

Parametric regression modeling (PRM) is a survival analysis technique that incorporates the effects of covariates on the survival times. PRM can include the following model types: accelerated failure time and frailty. Accelerated failure time models assume that the relationship of the logarithm of survival time and the covariates is linear. Frailty, or random effects, models are useful for analyzing recurrent events, correlated survival data, or when observations are clustered into groups.

Shared Operational Information

In some embodiments, an infrastructure for the data platform and data science experience component can include collections of "dockerized" containers of data and analytics services, which can be managed by a management system for automating deployment, scaling, and management of containerized microservices applications. Such an infrastructure can allow a system to have loose coupling between modules and horizontally scale out data, analytics, and model services, for instance, on a need basis. The data services within a system's data platform can have an integrated data layer to enable connecting and storing metadata to existing data stores and/or object storage, which may be external to the data platform. For those data services and storage, data management and governance capabilities for ingestion (extract, transform, load), audit, lineage, entity resolution, master data management, and global name management can be made available as applicable.

Visualization

Users can use visualizations in documents to present data visually to help identify patterns, gain insights, and make decisions. The data science experience component, for example, can include visualization libraries and packages, and/or plugins. Visualization tools can include interactive graph and/or charting tools and other visualization tools.

Streaming Computing

The data platform can support streaming computing, which can allow the user to ingest, analyze and correlate information as it arrives from thousands of sources without the burden of managing all infrastructure operations in house. Streaming computing can allow the user to quickly develop data stream analytic applications, for example, in the cloud and respond quickly to changing mission environments by analyzing larger volumes of data. Streaming computing can support data-in-motion use cases. Streaming computing can provide intelligent ingest, where data can be analyzed and selected data determined to be of value cab be persisted. Streaming computing can also provide summary of the data; filtering of the data; enrichment of the data, for example, before it is persisted. Streaming computing can provide quick, e.g., sub-millisecond, response times and extremely high throughput rates to enable insight and action on millions of events or messages per second. Streaming computing is able to scale up support any number of sources, scaling up and down as needed. Streaming computing also enables a breadth of deep analytics including text, geospatial, sensor, video and more.

Figure 2A:
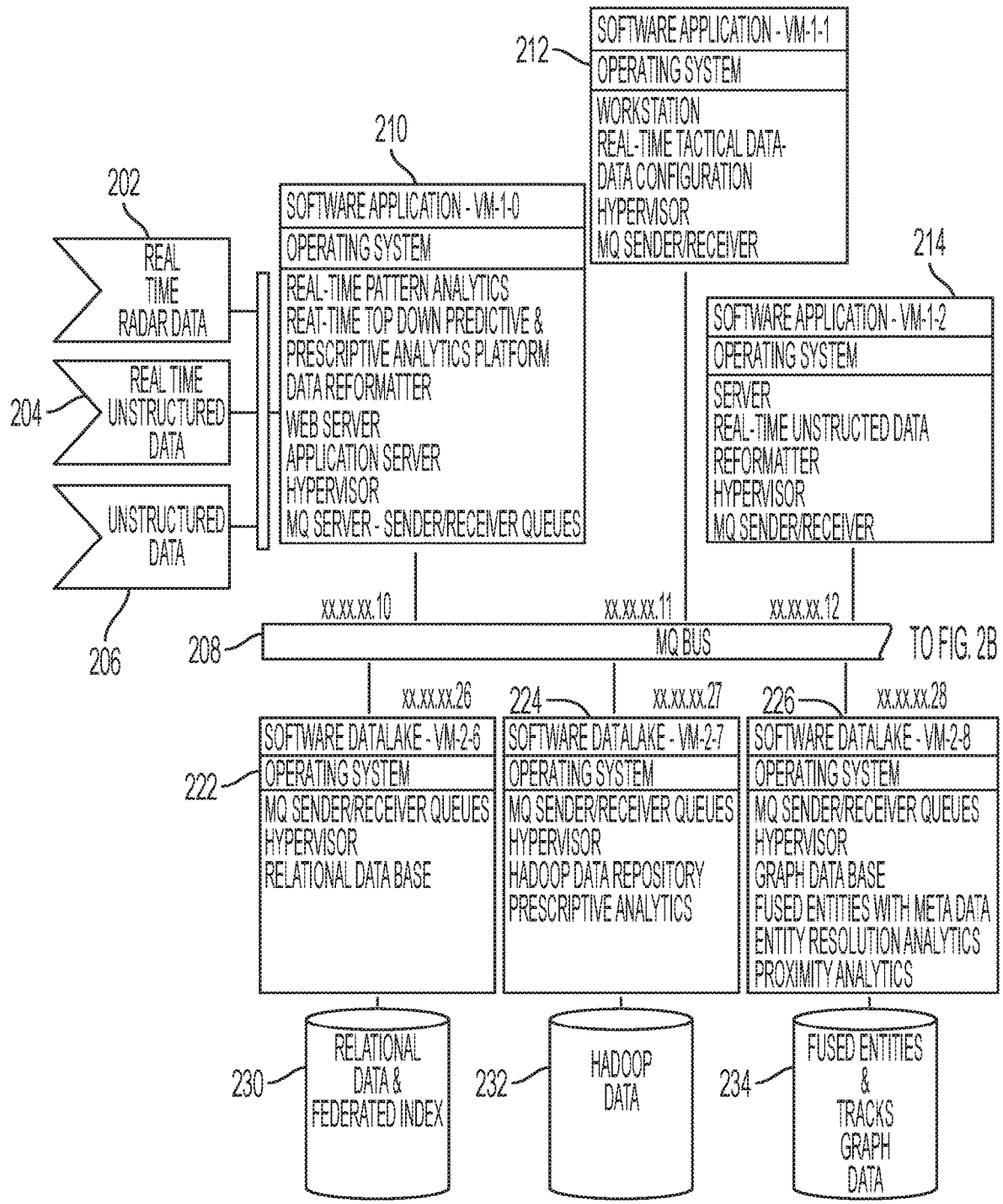
FIGS. 2A and 2B are a diagram illustrating virtual machines implementing a situation awareness system in one embodiment.
Figure 2B:
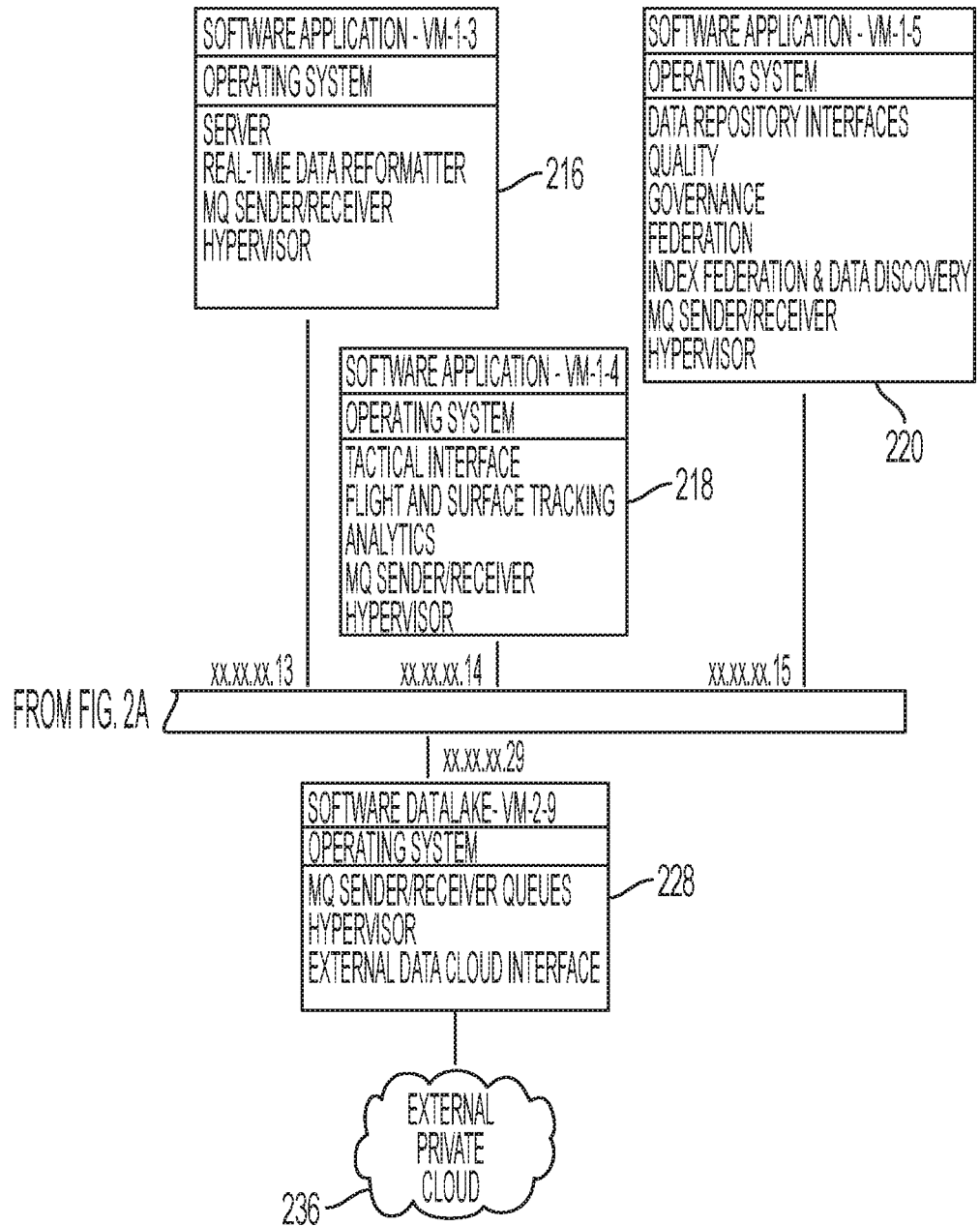

FIGS. 2A and 2B are a diagram illustrating virtual machines implementing a situation awareness system in one embodiment. An implementation of a system in one embodiment may include virtual machines, which may utilize an MQ publish/subscribe structure using a message queue bus, for example, IBM® MQ messages, from International Business Machines Corporation, Armonk, N.Y. Data received, collected and/or communicated may include real-time sensor data 202, including, but not limited to radar data, real-time unstructured data 204 and other unstructured data 206. A plurality of virtual machines communicate by a message queue method, for example, by placing a message on a message queue bus 208 (e.g., MQ bus), and/or reading or receiving a message from the message queue bus 210. For example, a virtual machine 210 may run a software application and an operating system. The virtual machine 210, for example, may include the following capabilities: real-time pattern analytics, real-time top down predictive and prescriptive analytics platform, real-time radar data reformatter, web server, application server, hypervisor, and a message queue server such as the MQ server (e.g., implementing sender and receiver queues). The virtual machine 210, for example, may receive real-time radar data 202 and process the data, and place the processed data on the message queue bus 208. For example, the received radar data can be processed into aviation air data and put on the bus 208, for another application to process. The virtual machine 210 may also include a controller, which can direct the data, for example, knows to where or to which application the data needs to be communicated.

Another virtual machine 212 may be running a software application and an operating system, and may include functionalities or components such as a workstation, real-time tactical data configuration, hypervisor and a message queue server such as the MQ server (e.g., implementing sender and receiver queues). The virtual machine 212 also publishes and/or subscribes to the message queue bus 208, processing data, placing data on the message queue bus 208, and receiving data from the message queue bus 208.

Still another virtual machine 214 may be running a software application and an operating system, and may include functionalities or components such as a server, a real-time unstructured data reformatter, hypervisor, and a message queue server such as the MQ server (e.g., implementing sender and receiver queues). The virtual machine 214 publishes and/or subscribes to the message queue bus 208, processing data, placing data on the message queue bus 208, and receiving data from the message queue bus 208.

Yet another virtual machine 216 may be running a software application and an operating system, and may include functionalities or components such as a server, a real-time radar data reformatter, hypervisor, and a message queue server such as the MQ server (e.g., implementing sender and receiver queues). The virtual machine 216 publishes and/or subscribes to the message queue bus 208, processing data, placing data on the message queue bus 208, and receiving data from the message queue bus 208.

Another virtual machine 218 may be running a software application and an operating system, and may include functionalities or components such as a tactical interface, flight and surface tracking analytics, hypervisor, and a message queue server such as the MQ server (e.g., implementing sender and receiver queues). The virtual machine 218 publishes and/or subscribes to the message queue bus 208, processing data, placing data on the message queue bus 208, and receiving data from the message queue bus 208. This virtual machine 218, for example, may include a visualization functionality that may provide flight or airplane information on a screen with contextual information associated with flight or flights. For instance, such information for visualization can be received from a message queue 208, which information may have been processed by one or more of the virtual machines publishing and/or subscribing to the message queue 208, for example, from raw data such as the real-time sensor data 202.

Still another virtual machine 220 may be running a software application and an operating system, and may include functionalities or components such as data repository interfaces (e.g., for quality, governance and federation, index federation and data discovery), hypervisor, and a message queue server such as the MQ server (e.g., implementing sender and receiver queues). The virtual machine 220 publishes and/or subscribes to the message queue bus 208, processing data, placing data on the message queue bus 208, and receiving data from the message queue bus 208.

Another virtual machine 222 may be running a software application and an operating system, and may include functionalities or components such as a relational database, hypervisor, and a message queue server such as the MQ server (e.g., implementing sender and receiver queues). The virtual machine 222 may receive and store data in a database 230, for example, on a storage device, and send data from the database 230, via placing the data on the message queue bus 208, for instance, responsive to query. The database 230 may store past and present data, which can be used to detect anticipatory awareness by a system of the present disclosure.

Yet another virtual machine 224 may be running a software application and an operating system, and may include functionalities or components such as prescriptive analytics, Hadoop data repository or like data repository, hypervisor, and a message queue server such as the MQ server (e.g., implementing sender and receiver queues). The virtual machine 224 may receive and store data in a data repository 232, for example, on a storage device, and send data from the data repository 232, via placing the data on the message queue bus 208, for instance, responsive to query. The data repository 232 may store past and present data, which can be used to detect anticipatory awareness by a system of the present disclosure.

Still another virtual machine 226 may be running a software application and an operating system, and may include functionalities or components such as a graph database, fused entities with metadata, entity resolution analytics, proximity analytics, hypervisor, and a message queue server such as the MQ server (e.g., implementing sender and receiver queues). The virtual machine 226 publishes and/or subscribes to the message queue bus 208, processing data, placing data on the message queue bus 208, and receiving data from the message queue bus 208. The virtual machine 226 may store fused entities and graph data 234.

Another virtual machine 228 may be running a software application and an operating system, and may include functionalities or components such as an external data cloud interface, hypervisor, and a message queue server such as the MQ server (e.g., implementing sender and receiver queues). The virtual machine 228 may interface to an external computer such as an external private cloud 236 or the like, receive data from the external private cloud 236, and send data from the external private cloud 236, via placing the data on the message queue bus 208.

As shown, one or more virtual machines may communicate via a message queue bus 208 using publish/subscribe architecture, in performing situation awareness and providing a visualization cue for one or more analytics and future actions.

An example of source input or data received and processed by a methodology in some embodiments may include air traffic data. The methodology may be integrated with a third party component, which may be authorized to receive such data, process the data to create a data packet. Processed data may include signal intelligence data, radar tracks and imagery. The data in the data packet can be formatted in extensible markup language (XML) format. The methodology in one embodiment receives such data packet and can analyze the data and present the data to an end user in a user consumable form, such as visualization, graphs, charts, scatter plots, and/or others. In one embodiment, sample visualization can include the different flight routes for an airport. The visualization can be provided or displayed on a user interface via a plugin.

Figure 3:
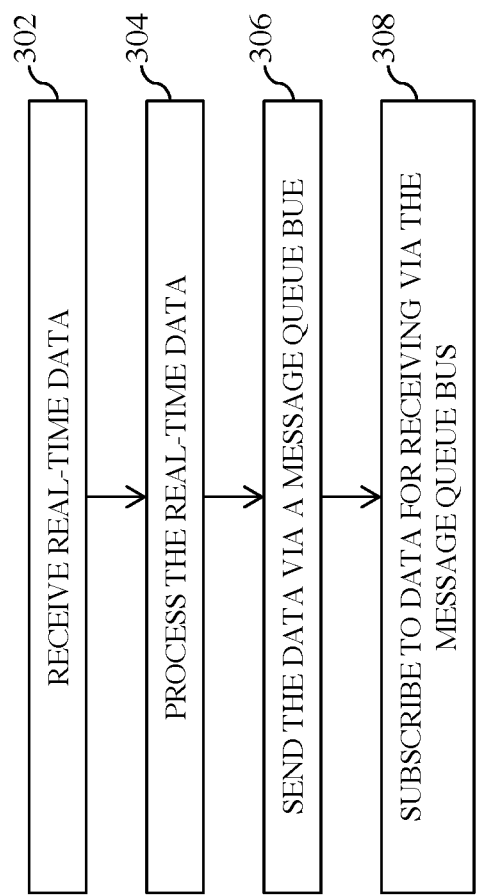
FIG. 3 is a flow diagram illustrating a method in one embodiment.

FIG. 3 is a flow diagram illustrating a method in one embodiment. At 302, real-time data may be received. The real-time data may include one or more of sensor data such as radar data, unstructured data, and structured data. At 304, a virtual machine running an application may process the data. At 306, the virtual machine may send the processed data via a message queue bus, for example, to a subscribed of that data. The message queue bus supports publish and subscribe architecture. For instance, the data placed on the message queue bus can be sent to another virtual machine subscribing to that data. In another aspect, at 308, the virtual machine may also subscribe to data. Responsive to the subscribed to data being placed or received on the message queue bus, the virtual machine receives that data for its processing. There may be a plurality of virtual machines performing publish and/or subscribe functions, for sending and receiving data, for processing. Each of the plurality of virtual machines may perform its functions. For instance, a virtual machine may perform ingesting of data; another virtual machine may perform data integration and/or data persistence, for example, saving data on a storage, for instance, as structured and/or unstructured data. Yet another virtual machine may perform visualization, for example, present information to an end-user in a user friendly format. In one aspect, each of the virtual machines may be running an operating system and a hypervisor.

Figure 4:
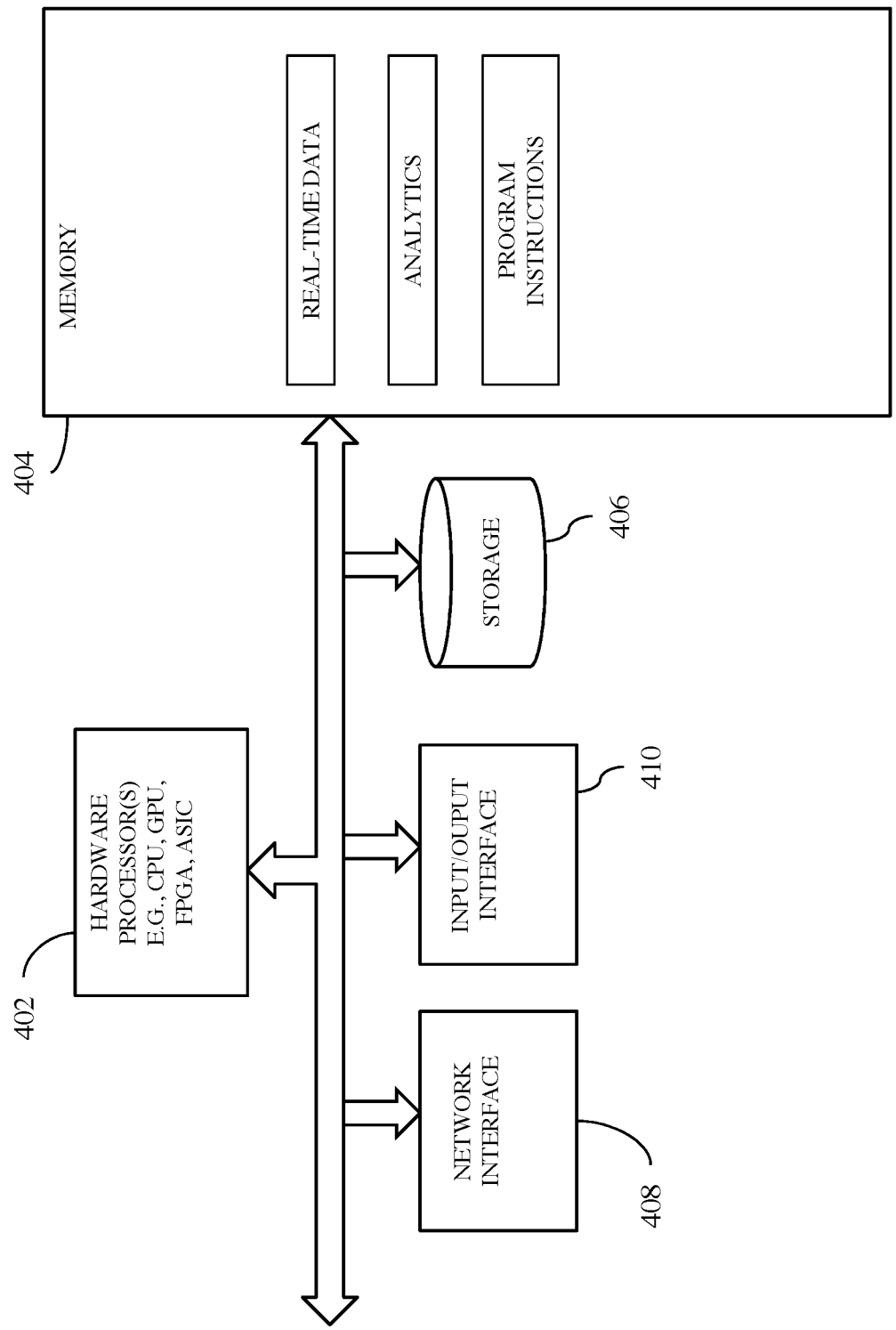
FIG. 4 is a diagram showing components of a system in one embodiment that can provide situational awareness.

FIG. 4 is a diagram showing components of a system in one embodiment that can provide situational awareness. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and provide a framework for facilitating situational awareness. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input, which may include one or combinations of real-time data such as sensor data (or other data), structured data, semi-structured data, and unstructured data. For instance, at least one hardware processor 602 may process the data, for example, perform one or more of ingesting of the data, persisting the data or selected data, analyzing the data, and deploying an application or application programming interface (API) for generating an output, for example, for visualization, report, and/or another output. In one aspect, data may be stored on a storage device 606 or received via a network interface 608 from a remote device, and may be temporarily loaded into a memory device 604 for processing. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

The system and/or method can provide a secured-communication and operational system, and can be applicable in many scenarios such as in intelligence community, air traffic control, and business operations.

In some embodiments, intelligence framework may include synchronized functions using pre-configured software products. The intelligence framework may be scalable, reusable, and extensible, and may facilitate rapid development, deployment, and evolution of mission threads. The intelligence framework may provide features such as control and operations center, data sources, data integration, analytical resources, shared operational information, actionable insight, visualization, streaming computing, application hosting and services, and access services.

Figure 5:
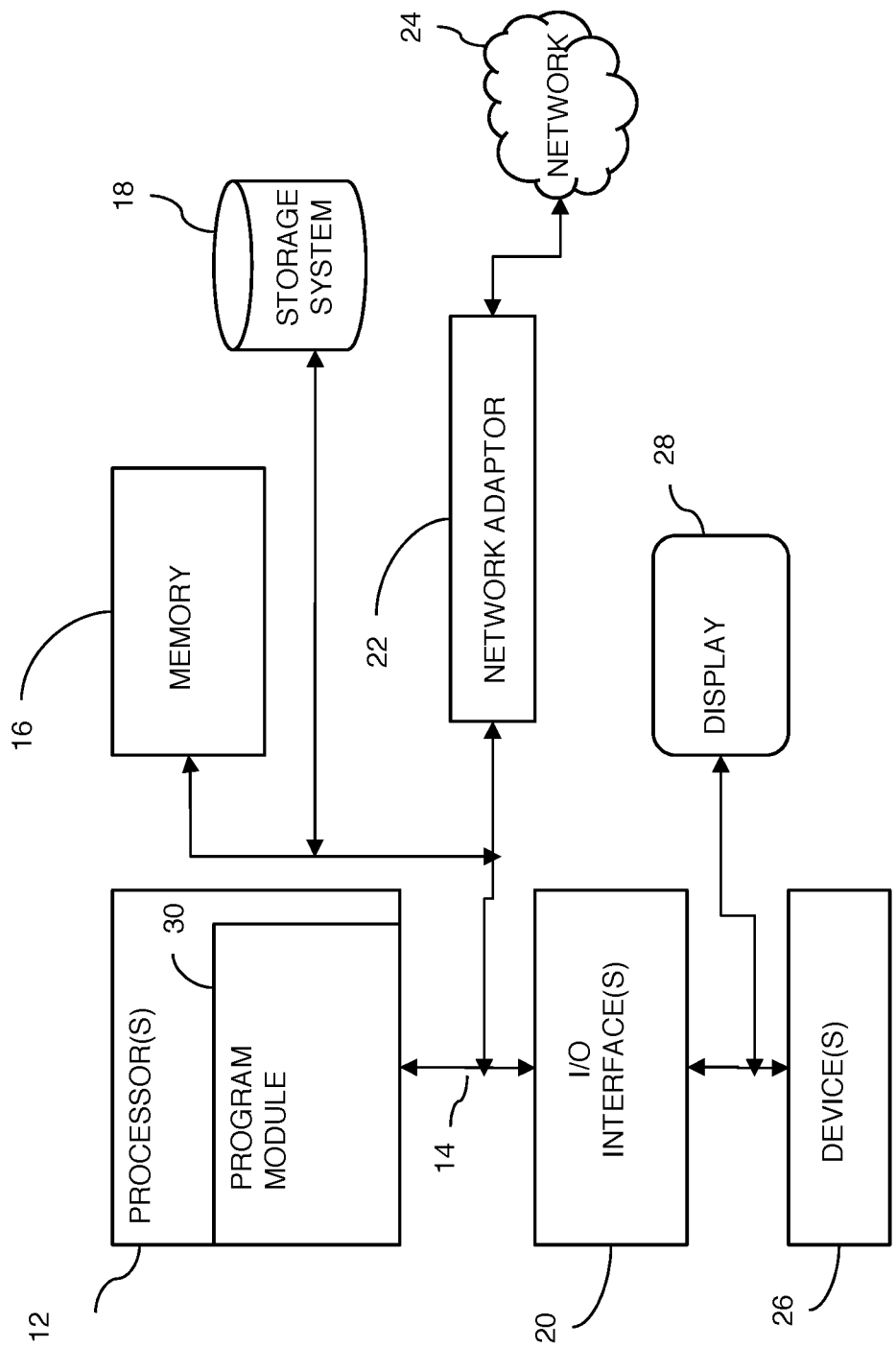
FIG. 5 illustrates a schematic of an example computer or processing system that may implement a situational awareness system in one embodiment.

FIG. 5 illustrates a schematic of an example computer or processing system that may implement a situational awareness system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a program module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
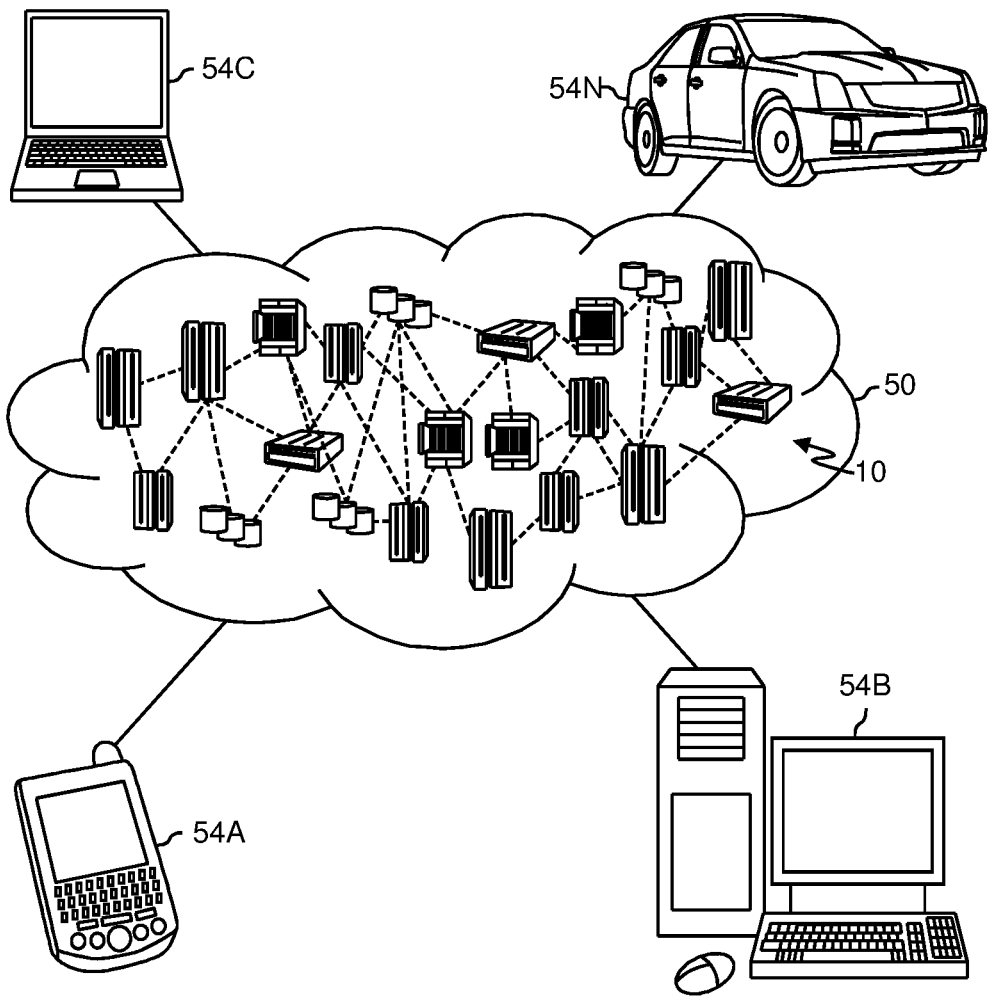
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
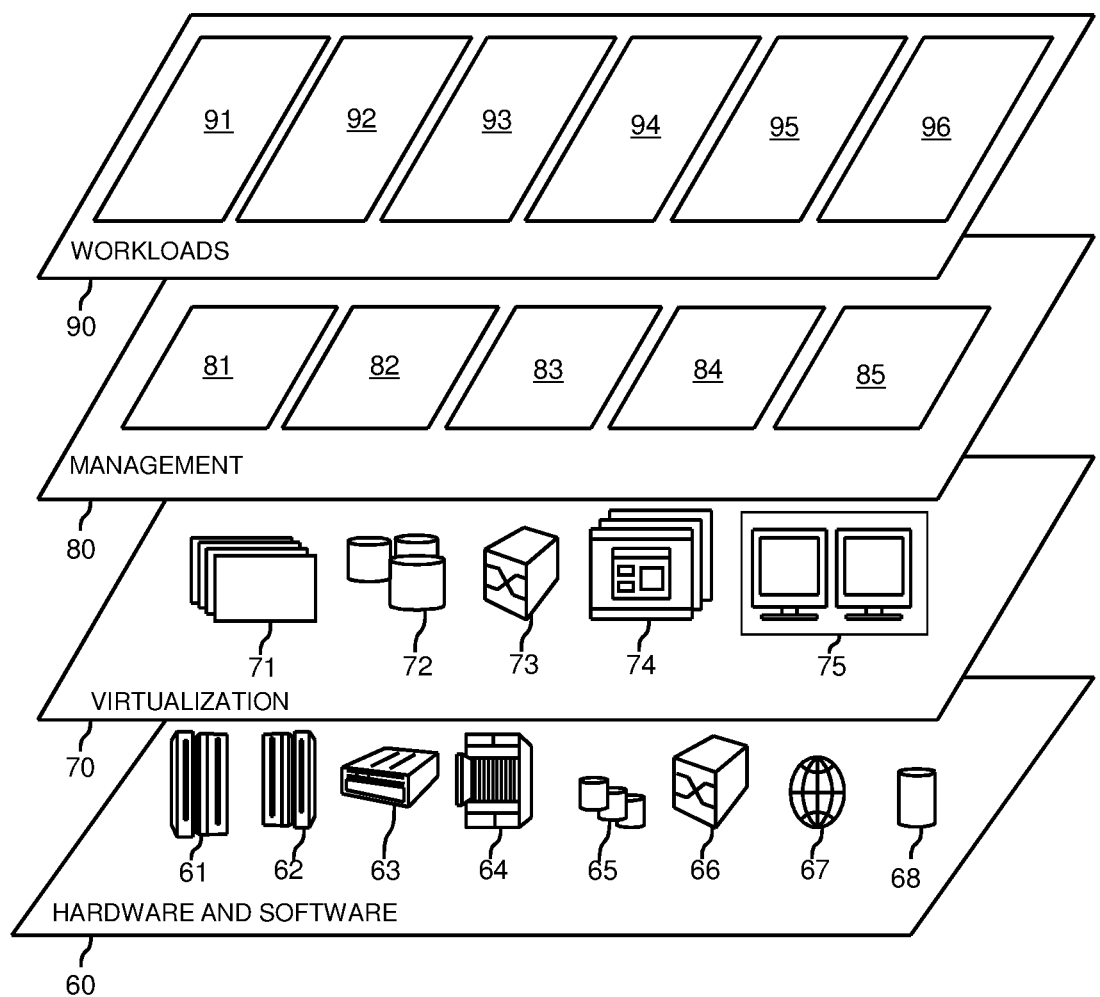
FIG. 7 illustrates a set of functional abstraction layers provided by cloud computing environment in one embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent situational awareness processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   at least one hardware processor; and
   a storage device coupled with the at least one hardware process;
   the at least one hardware processor operable to at least:
   receive real-time data from a plurality of data sources;
   ingest the real-time data;
   persist at least some of the real-time data on the storage device;
   analyze the real-time data to derive at least one insight; and
   generate an output associated with the at least one insight for real-time visualization,
   the at least one hardware processor further operable to run a virtual machine, the virtual machine configured to use a message queue publish and subscribe structure to receive the real-time data, the at least one hardware processor further configured to remember a sequence of applications executed to solve a given problem and recommend an application in the sequence that is working for the given problem, wherein the applications include data ingestion applications, machine learning applications, analytics applications and predictive applications, and the given problem includes detecting disruptive events before the events occur, wherein at least one of the data ingestion applications extract, filter and fuse data from a plurality of sources based on geography and time.

2. The system of claim 1, wherein the real-time data comprises at least real-time sensor data.

3. The system of claim 1, wherein the at least one hardware processor ingests the data by transforming and cleansing the real-time data into a format for analyzing.

4. The system of claim 1, wherein the at least one hardware processor executes an artificial intelligence model to analyze the real-time data.

5. The system of claim 1, wherein the at least one hardware processor trains an artificial intelligence model based on the real-time data.

6. The system of claim 1, wherein the at least one hardware processor interfaces with a plurality of user functionalities.

7. The system of claim 6, wherein the plurality of user functionalities comprises data engineering, data science, analysis and application development, wherein the hardware processor allows for data sharing and collaboration among the user functionalities.

8. The system of claim 1, wherein the at least one hardware processor recommends an action based on the at least one insight.

9. A computer program product comprising a computer readable storage medium having program instructions embodied therewith, the program instructions executable by a processor to cause the processor to:
   receive real-time data from a plurality of data sources;
   ingest the real-time data;
   persist at least some of the real-time data on a storage device;
   analyze the real-time data to derive at least one insight; and
   generate an output associated with the at least one insight for real-time visualization,
   the processor further caused to run a virtual machine, the virtual machine configured to use a message queue publish and subscribe structure to receive the real-time data, the processor further caused to remember a sequence of applications executed to solve a given problem and recommend an application in the sequence that is working for the given problem, wherein the applications include data ingestion applications, machine learning applications, analytics applications and predictive applications, and the given problem includes detecting disruptive events before the events occur, wherein at least one of the data ingestion applications extract, filter and fuse data from a plurality of sources based on geography and time.

10. The computer program product of claim 9, wherein the real-time data comprises at least real-time sensor data.

11. The computer program product of claim 9, wherein the processor is caused to transform and cleanse the real-time data into a format for analyzing in ingesting the data.

12. The computer program product of claim 9, wherein the processor is caused to execute an artificial intelligence model to analyze the real-time data.

13. The computer program product of claim 9, wherein the processor is caused to train an artificial intelligence model based on the real-time data.

14. The computer program product of claim 9, wherein the processor is caused to interface with a plurality of user functionalities.

15. The computer program product of claim 14, wherein the plurality of user functionalities comprises data engineering, data science, analysis and application development, wherein the processor is caused to allow data sharing and collaboration among the user functionalities.

16. The computer program product of claim 9, wherein the processor is caused to recommend an action based on the at least one insight.

17. A method comprising:
receiving real-time data from a plurality of data sources;
ingesting the real-time data;
persisting at least some of the real-time data on a storage device;
analyzing the real-time data to derive at least one insight; and
generating an output associated with the at least one insight for real-time visualization,
the method performed by a hardware processor, wherein a virtual machine running on the hardware processor is configured to use a message queue publish and subscribe structure to receive the real-time data, the hardware processor further remembering a sequence of applications executed to solve a given problem and recommend an application in the sequence that is working for the given problem, wherein the applications include data ingestion applications, machine learning applications, analytics applications and predictive applications, and the given problem includes detecting disruptive events before the events occur, wherein at least one of the data ingestion applications extract, filter and fuse data from a plurality of sources based on geography and time.

18. The method of claim 17, wherein the ingesting comprises transforming and cleansing the real-time data into a format for the analyzing.

19. The method of claim 17, further comprising executing an artificial intelligence model to analyze the real-time data.

20. The method of claim 19, further comprising retraining the artificial intelligence model based on the real-time data.

* * * * *